US009841565B2

(12) United States Patent
Courjal et al.

(10) Patent No.: US 9,841,565 B2
(45) Date of Patent: Dec. 12, 2017

(54) METHOD FOR PRODUCING A RIDGE OPTICAL WAVEGUIDE HAVING LOW COUPLING LOSSES BETWEEN THE RIDGE OPTICAL WAVEGUIDE AND AN OPTICAL FIBRE, AND A RIDGE OPTICAL WAVEGUIDE MADE USING THIS METHOD

(71) Applicants: Centre National de la Recherche Scientifique, Paris (FR); Universite de Franche-Comte, Besancon (FR)

(72) Inventors: Nadege Courjal, Beure (FR); Arnaud Gerthoffer, Pouilley les Vignes (FR); Fabien Henrot, Besancon (FR); Jean-Yves Rauch, Serre les Sapins (FR); Clement Guyot, Besancon (FR); Blandine Edouard, Auxon-Dessous (FR)

(73) Assignees: CENTRE NATIONAL POUR LA RECHERCHE SCIENTIFIQUE, Paris (FR); UNIVERSITE DE FRANCHE-COMTE, Besancon (FR)

( * ) Notice: Subject to any disclaimer, the term of this patent is extended or adjusted under 35 U.S.C. 154(b) by 0 days.

(21) Appl. No.: 15/115,473

(22) PCT Filed: Jan. 29, 2015

(86) PCT No.: PCT/EP2015/051853
§ 371 (c)(1),
(2) Date: Jul. 29, 2016

(87) PCT Pub. No.: WO2015/114060
PCT Pub. Date: Aug. 6, 2015

(65) Prior Publication Data
US 2017/0184792 A1    Jun. 29, 2017

(30) Foreign Application Priority Data
Jan. 31, 2014  (FR) ..................................... 14 50795

(51) Int. Cl.
*G02B 6/30*    (2006.01)
*G02B 6/12*    (2006.01)
(Continued)

(52) U.S. Cl.
CPC ........... *G02B 6/305* (2013.01); *G02B 6/1228* (2013.01); *G02B 6/14* (2013.01); *G02B 6/25* (2013.01);
(Continued)

(58) Field of Classification Search
CPC .............................. G02B 6/1228; G02B 6/305
See application file for complete search history.

(56) References Cited

U.S. PATENT DOCUMENTS 5,465,312 A  * 11/1995  Maxwell ................. G02B 6/30
                                                              385/14
6,240,233 B1 *  5/2001  Weinert ................ G02B 6/305
                                                              385/131
(Continued)

FOREIGN PATENT DOCUMENTS

EP          2 006 732       12/2008
WO     WO 2009/096321      8/2009

OTHER PUBLICATIONS

International Search Report dated Apr. 7, 2015 out of priority Application No. PCT/EP2015/051853 (4 pages).
(Continued)

*Primary Examiner* — Michelle R Connelly
(74) *Attorney, Agent, or Firm* — Brinks Gilson & Lione; G. Peter Nichols (57) ABSTRACT

A method for producing a ridge optical waveguide having low coupling losses between the ridge optical waveguide and an optical fiber includes forming on the surface of a dielectric substrate an optical waveguide having a first end and a second end opposite the first end; cutting out two
(Continued)

parallel recesses spaced apart by a distance wr on the surface of the dielectric substrate to form a rigid optical waveguide with an increased width (wr) between the two recesses. The recesses are cut such that the depth of each recess changes continuously and gradually between a zero depth at the height of the first end of the optical waveguide and a maximum depth ($H_m$) at a pre-determined distance ($I_p$) from the first end.

19 Claims, 9 Drawing Sheets (51) Int. Cl.
    *G02B 6/14*     (2006.01)
    *G02B 6/25*     (2006.01)
    *G02B 6/122*     (2006.01)

(52) U.S. Cl.
    CPC ...... *G02B 6/30* (2013.01); *G02B 2006/12097* (2013.01); *G02B 2006/12195* (2013.01)

(56) References Cited

U.S. PATENT DOCUMENTS

| | | | | |
|---|---|---|---|---|
| 6,571,039 B1* | 5/2003 | Al-hemyari | .......... | G02B 6/1228 385/131 |
| 6,587,609 B2* | 7/2003 | Lee | .......... | G02B 6/12011 385/129 |
| 6,862,393 B2* | 3/2005 | Nashimoto | .......... | G02B 6/1228 385/129 |
| 7,389,030 B2* | 6/2008 | Mitomi | .......... | G02F 1/035 385/129 |
| 7,643,205 B2* | 1/2010 | Yoshino | .......... | G02F 1/3775 359/326 |
| 7,974,501 B2* | 7/2011 | Hamajima | .......... | G02B 6/4202 359/245 |
| 8,447,152 B2* | 5/2013 | Lee | .......... | G02B 6/1228 385/39 |
| 9,417,388 B2* | 8/2016 | Yamasaki | .......... | G02B 6/1228 |
| 2002/0146205 A1* | 10/2002 | Shimoda | .......... | G02B 6/1228 385/43 |
| 2002/0168166 A1* | 11/2002 | Itoh | .......... | G02B 6/1228 385/129 |
| 2003/0081900 A1* | 5/2003 | Nashimoto | .......... | G02B 6/1228 385/43 |
| 2003/0223719 A1* | 12/2003 | Salib | .......... | G02B 6/1228 385/129 |
| 2006/0109542 A1 | 5/2006 | Mizuuchi | | |
| 2012/0195546 A1* | 8/2012 | Anzai | .......... | G02F 1/3775 385/14 |

OTHER PUBLICATIONS

Written Opinion dated Apr. 7, 2015 out of priority Application No. PCT/EP2015/051853 (5 pages).

\* cited by examiner

METHOD FOR PRODUCING A RIDGE OPTICAL WAVEGUIDE HAVING LOW COUPLING LOSSES BETWEEN THE RIDGE OPTICAL WAVEGUIDE AND AN OPTICAL FIBRE, AND A RIDGE OPTICAL WAVEGUIDE MADE USING THIS METHOD

This application claims priority to International Application No. PCT/EP2015/051853 filed Jan. 29, 2015 and to French Application No. 1450795 filed Jan. 31, 2014; the entire contents of each are incorporated herein by reference.

BACKGROUND

The present invention generally relates to ridge waveguides, which is a waveguide taking the form of a ridge or microguide. More precisely, the invention relates to a method for producing ridge optical waveguides having low coupling losses between the ridge optical waveguides and an optical fiber. Furthermore, the invention relates to ridge optical waveguides fabricated by the aforementioned method.

SUMMARY

Ridge optical waveguides have attracted much attention over the past thirty years, owing to their potential to confine light for reinforcing electro-optical, non-linear or acousto-optical interactions.

Figure 1:
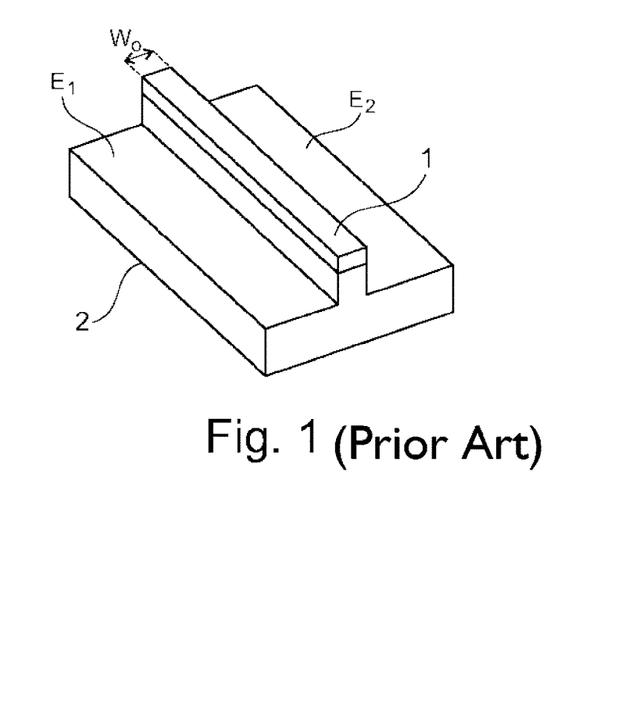
FIG. 1 shows a perspective view of a ridge optical waveguide of the prior art.

FIG. 1 illustrates one example of a conventional ridge optical waveguide. Specifically, FIG. 1 illustrates a ridge optical waveguide 1 formed on the surface of a dielectric substrate 2. The ridge optical waveguide 1 has a width $w_0$ and it is raised up between two recesses (E1, E2) of the dielectric substrate 2.

One conventional method for the fabrication of the ridge optical waveguide illustrated in FIG. 1 comprises a preliminary step for formation of an optical waveguide (planar or microstrip) on the surface of a dielectric substrate, in order to provide the vertical confinement of the electromagnetic wave. Then, the surface of the dielectric substrate is etched for the fabrication of a ridge optical waveguide which provides the lateral confinement of the electromagnetic wave. Specifically, the etching of the dielectric substrate according to this conventional method is implemented by first of all carrying out a lithography step on the surface of the dielectric substrate in order to write the pattern for an area that it is desired not to etch. This lithography step is followed by a step for deposition of a material for the "mask" which covers and protects the surface of this area not to be etched. Then, a step for etching the areas of the dielectric substrate that are not protected by the mask is carried out in order to form a ridge optical waveguide over the length of the area protected by the mask. The etching of the unprotected areas of the dielectric substrate may be a wet etch (for example a hydrofluoric acid etch) or a dry etch (for example ion etching of the plasma type).

This conventional method is cumbersome and costly in time. After the preliminary step for formation of an optical waveguide, planar or microstrip, which lasts approximately 24 hours, the etching of the dielectric substrate lasts for a minimum of 2.5 hours. Furthermore, this conventional method uses a large quantity of consumables. Specifically, according to the conventional method, the etching of the dielectric substrate begins with a lithography step that requires pipettes and photosensitive resists, a developer, de-ionized water for eliminating the developer and specific material pads on which to place the dielectric substrate. Furthermore, as mentioned hereinabove, the etching of the dielectric substrate requires the deposition of a mask (generally a metal mask) for covering the surface of the area not to be etched. Furthermore, it requires solvents and chemical products for removing the residues of the mask after etching and cleaning the dielectric substrate. In addition, the implementation of the conventional method requires a cleanroom environment which involves the use of a cleanroom suit, throw-away gloves and protective goggles. The etching of the dielectric substrate according to the conventional method also requires specific targets for the deposition of the mask, gas lines and an etch tool. Moreover, the form factors (height/width ratio) of the ridge optical waveguide fabricated by this conventional method are limited by the thickness of the mask protecting the dielectric substrate during the etching.

The publication "High aspect ratio lithium niobate ridge waveguides fabricated by optical grade dicing, J. Phys. D: Appl. Phys, 44 305101, (2011)" describes an alternative method for the fabrication of the ridge optical waveguide in FIG. 1. This method is simpler, faster and less costly to implement. Specifically, this method also comprises a preliminary step for formation of an optical waveguide (planar or microstrip) on a surface of the dielectric substrate in order to provide the vertical confinement of the electromagnetic wave. This preliminary step lasts approximately 24 hours, as is the case for the preliminary step of the conventional method. However, according to this method, the ridge optical waveguide that provides the lateral confinement of the electromagnetic wave is formed by the dicing-polishing of two parallel recesses separated by a distance $w_0$ on the surface of the dielectric substrate, and not by the etching of the dielectric substrate according to the conventional method described hereinabove. This dicing-polishing is carried out in a single step by means of a circular saw comprising at least one blade (for example a precision circular saw of the type DISCO DAD 321) and it lasts approximately 15 minutes for the fabrication of a ridge optical waveguide. Thus, using the method of the aforementioned publication, there is a gain in time of at least 2.15 hours compared with the conventional method. Furthermore, the consumables used during the dicing step are limited to the blade of the circular saw, an adhesive film for holding the dielectric substrate at a fixed position on a dicing plate and cooling liquid used to cool the blade of the circular saw during the dicing. Furthermore, the method of the aforementioned publication is not implemented in a cleanroom, and thus the consumables used in a cleanroom are not used for implementing this method. Moreover, it should be noted that, in the method of the aforementioned publication, the use of a mask protecting the dielectric substrate during the dicing is not required. Thus, the form factors (height/width ratio) of the ridge optical waveguide fabricated by this method are not limited by the thickness of such a mask.

Figure 2:
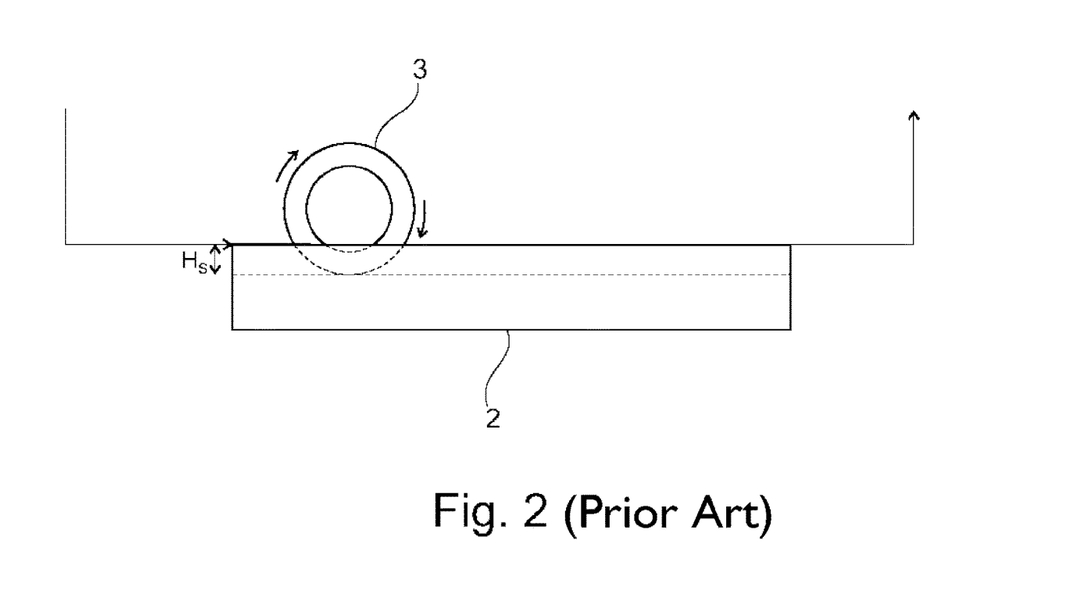
FIG. 2 shows the dicing of a dielectric substrate for the formation of a ridge optical waveguide according to a method for producing a ridge optical waveguide of the prior art.

Specifically, as illustrated in FIG. 2, this dicing-polishing is carried out by means of a circular saw whose blade 3 goes down to the desired dicing depth $H_s$ upstream of the dielectric substrate 2 and then it executes a parallel translational movement over the whole length of the surface of the dielectric substrate 2 in order to carry out the dicing-polishing of the parallel recesses (E1, E2) separated by a distance $w_0$. It should be noted that the desired dicing depth $H_s$ corresponds to the depth of the ridge optical waveguide formed by this dicing. The path followed by the blade 3 in order to carry out the dicing-polishing of the dielectric substrate 2 is represented by the arrows in FIG. 2.

However, when the ridge optical waveguide fabricated by the methods described hereinabove is coupled with a conventional optical fiber (for example an optical fiber of the type SMF28 with a weakly-confined optical mode), there are significant coupling losses between the ridge optical waveguide and the conventional optical fiber. Here, coupling losses between the ridge optical waveguide and the optical fiber are understood to mean losses of electromagnetic energy at the connection between the ridge optical waveguide and the optical fiber, where the electromagnetic energy is transmitted between the optical fiber and the ridge optical waveguide.

The reason for these coupling losses is that the optical mode of the ridge optical waveguide is more confined than the optical mode of the conventional optical fiber, in other words the lateral width at half-height of the optical mode in the ridge optical waveguide is smaller than the lateral width at half-height of the optical mode in the conventional optical fiber. According to one example, a ridge optical waveguide with a width $w_0$ of 6 µm has a lateral width at half-height of the optical mode typically between 2 µm and 2.5 µm, whereas a conventional fiber has a lateral width at half-height of the optical mode typically of the order of 5 µm. Thus, a large part of the energy of the electromagnetic wave transmitted by the conventional optical fiber is lost at the connection of the conventional optical fiber with the ridge optical waveguide.

Figure 3:
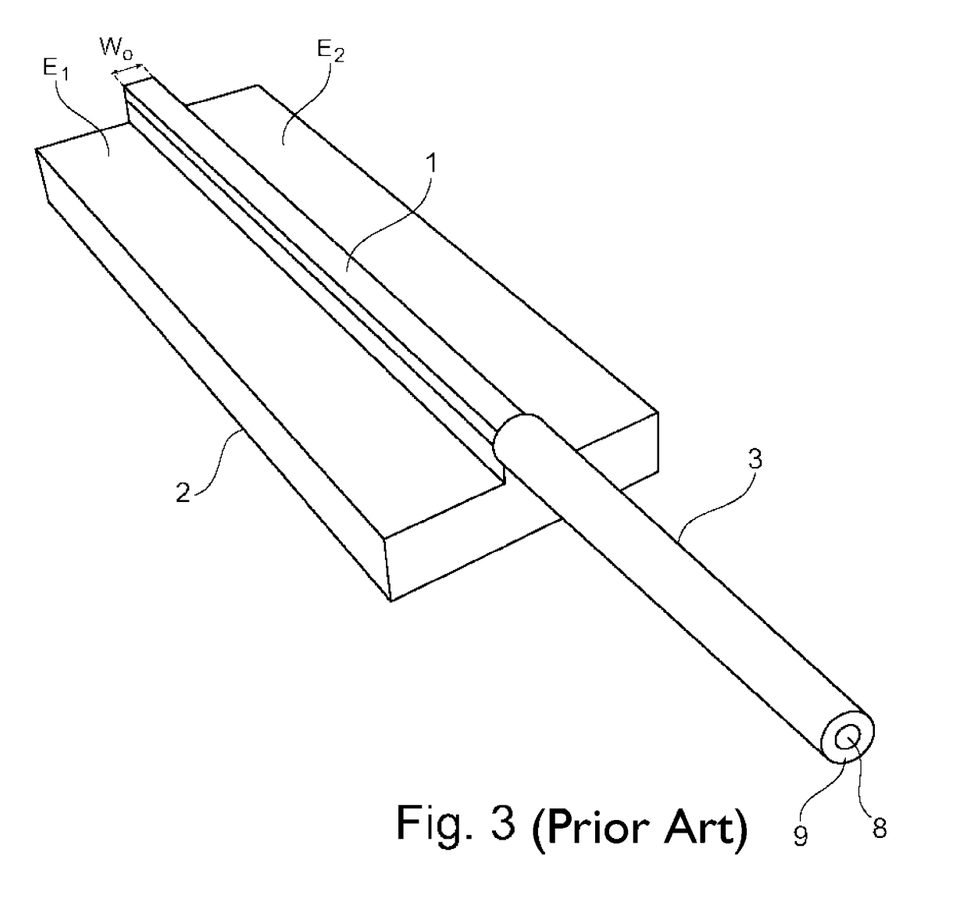
FIG. 3 shows the connection between the ridge optical waveguide in FIG. 1 and a conventional optical fiber.

Specifically, FIG. 3 illustrates one example of a connection between the ridge optical waveguide 1 in FIG. 1 with a conventional optical fiber 3. As is known to those skilled in the art, the conventional optical fiber 3 comprises a core 8 which transmits the electromagnetic energy along the optical fiber and which is surrounded by a sheath 9. Specifically, when the connection is made between the ridge optical waveguide 1 and the conventional optical fiber 3, the electromagnetic energy is transmitted by the core 8 to the ridge optical waveguide. As mentioned hereinabove, the fact that the optical mode of the ridge optical waveguide 1 is more confined than the optical mode of the conventional optical fiber 3 leads to significant coupling losses between the ridge optical waveguide and the conventional optical fiber 3. More precisely, these losses may be evaluated using the overlap integral η between the two aforementioned optical modes, according to the equation:

$$\eta = \frac{|\langle E_{in}, E_{out}\rangle|^2}{\langle E_{in}, E_{in}\rangle\langle E_{out}, E_{out}\rangle} \quad (I)$$

where $\langle a(x,y), b(x,y)\rangle = \iint a(x,y)\overline{b(x,y)}dx\,dy$ in which $a(x,y)$ corresponds to $E_{in}$ and $b(x,y)$ corresponds to $E_{out}$, and where $E_{in}$ indicates the spatial distribution of the electric field in the ridge optical waveguide, and $E_{out}$ indicates the spatial distribution of the electric field in the optical fiber. Thus, if the optical mode of the ridge optical waveguide has a profile very different from that of the optical mode of the conventional optical fiber (which may be evaluated by a comparison of the widths at half-height of the optical modes), the integral overlap is very small, as is the electromagnetic energy transmitted between the optical fiber and the ridge optical waveguide.

There consequently exists a real need to provide a method for producing a ridge optical waveguide that is simple, fast and inexpensive, as is the case in the method provided in the aforementioned publication, but which at the same time is capable of producing a ridge optical waveguide having low coupling losses between the ridge waveguide and a conventional optical fiber.

One subject of the invention relates to a method for producing a ridge optical waveguide having low coupling losses between the ridge optical waveguide and an optical fiber, the method comprising the following steps:

formation of an optical waveguide on the surface of a dielectric substrate, the optical waveguide having a first end and a second end opposite to the first end;

dicing of two parallel recesses separated by a distance $w_r$ on the surface of the dielectric substrate in order to form a ridge optical waveguide with a width $w_r$ raised up between the two recesses, characterized in that the dicing is such that the depth of each recess varies continuously and progressively between a depth of zero at the location of the first end of the optical waveguide designed to receive the optical fiber, and a maximum depth at a predetermined distance $I_p$ from the first end of the optical waveguide, the depth variation of each recess forming a vertical optical mode transition region of length $I_p$ between the ridge optical waveguide and the optical fiber.

The vertical optical mode transition region between the ridge optical waveguide and the optical fiber, formed after the dicing of the dielectric substrate according to the method of the invention, serves to reduce the coupling losses between the ridge optical waveguide and the optical fiber.

Thus, the method of the invention is used to fabricate a ridge optical waveguide which has low coupling losses between the ridge optical waveguide and an optical fiber, in contrast to the ridge optical waveguides fabricated by the methods of the prior art which exhibit significant coupling losses between the ridge optical waveguide and an optical fiber. Furthermore, the method of the invention is simple, fast and inexpensive in comparison with the conventional method described in the prior art. Specifically, the fabrication of a ridge optical waveguide according to the method of the invention lasts approximately 24 hours (for the formation of the planar or microstrip optical waveguide) and approximately 15 minutes (for the dicing of the dielectric substrate in order to form a ridge optical waveguide). Furthermore, the consumables used during the dicing step are limited to the blade of a circular saw for carrying out the dicing, an adhesive film for holding the dielectric substrate at a fixed position on a dicing plate and cooling water used for cooling the blade of the circular saw after the dicing. Moreover, it should be noted that, in the method of the invention, the use of a mask protecting the dielectric substrate during the dicing is not required. Thus, the form factors (height/width ratio) of the ridge optical waveguide fabricated by the method of the invention are not limited by the thickness of such a mask.

Particular features or embodiments, usable alone or in combination, are:

the optical waveguide is a planar waveguide the depth reduction of each recess is carried out starting from the first end of the optical waveguide the optical waveguide is a microstrip waveguide the depth reduction of each recess is carried out starting from a predetermined distance from the first end of the optical waveguide the dicing is a mechanical dicing the mechanical dicing is carried out by means of a circular saw comprising at least one blade the mechanical dicing is carried out by means of a blade of the circular saw the blade of the circular saw is progressively lowered at the location of the predetermined distance from the first end of the optical waveguide, in such a manner that the depth varies as a circular arc of radius equal to the radius of the blade of the circular saw the blade of the circular saw executes a translational movement parallel to the surface of the dielectric substrate, once it has reached a desired depth for the aforementioned recesses the mechanical dicing is carried out by means of two blades of the circular saw with the same axis and set apart from one another by the width $w_r$ of the ridge optical waveguide the dicing is carried out by laser etching the dicing is such that the depth of each recess varies continuously and progressively between a depth of zero at the location of the second end of the optical waveguide and a maximum depth at a predetermined distance Ip from the second end of the optical waveguide designed to receive an optical fiber, the depth variation of each recess forming a vertical optical mode transition region of length $I_p$ between the ridge optical waveguide and an optical fiber Another subject of the invention relates to a ridge optical waveguide having low coupling losses between the ridge optical waveguide and an optical fiber, characterized in that it is fabricated by the method of the invention.

BRIEF DESCRIPTION OF THE DRAWINGS

The invention will be better understood upon reading the description that follows, presented solely by way of example, and with reference to the appended figures in which:

FIG. 8 shows the dicing of the surface of the dielectric substrate carried out for fabricating a ridge optical waveguide having the configuration of the ridge optical waveguide of the example in FIG. 6a;

DETAILED DESCRIPTION

It should be noted that the figures are purely illustrative and the dimensions of the optical devices illustrated are not proportional to the actual dimensions of these devices.

Figure 4:
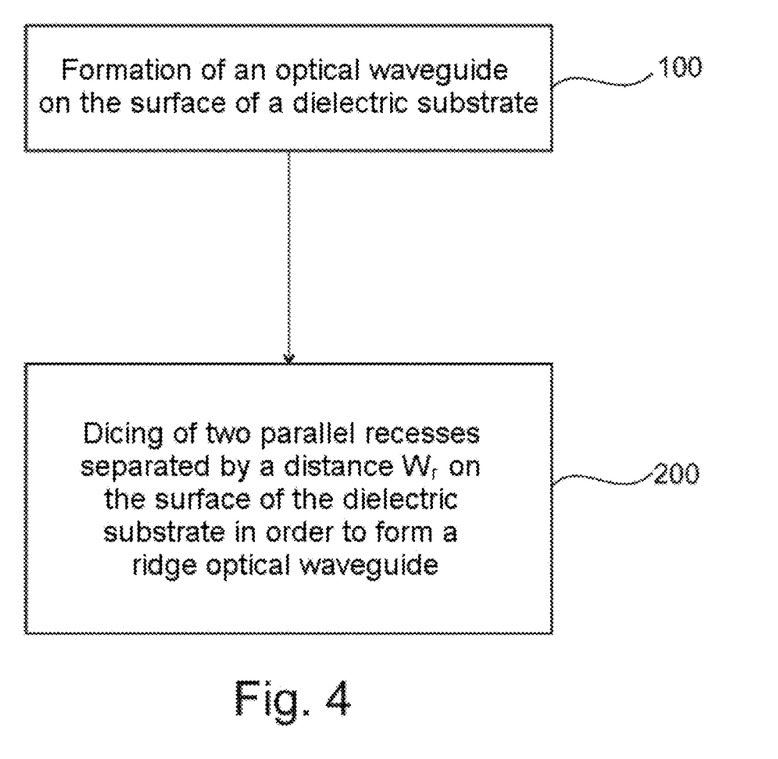
FIG. 4 shows a method for producing a ridge optical waveguide according to one embodiment of the invention.

FIG. 4 shows one embodiment of a method for producing a ridge optical waveguide which exhibits low coupling losses when it is coupled with a conventional optical fiber (for example an optical fiber of the type SMF28 with a weakly-confined optical mode).

In a step 100 of the method in FIG. 4, the formation of an optical waveguide is carried out on the surface of a dielectric substrate 10 in order to provide the vertical confinement of the electromagnetic wave. This optical waveguide has a first end A and a second end B opposite to the first end A.

Preferably, the dielectric substrate 10 is composed of lithium niobate ($LiNbO_3$). It has been observed that the dielectric substrate of lithium niobate ($LiNbO_3$) displays coupling losses between the standard microstrip optical waveguide (of the titanium diffusion type) and an optical fiber which are lower than the coupling losses displayed by other types of dielectric substrates. In another example, the dielectric substrate is composed of glass. However, it should be noted that the dielectric substrate may be composed of other types of materials, as long as the electromagnetic wave can be vertically confined by these materials.

Figure 5A:
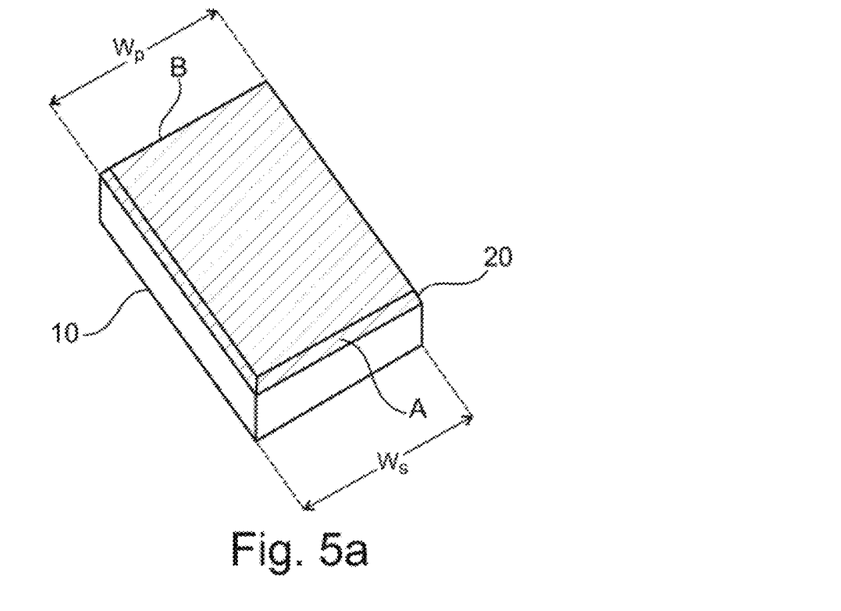
FIG. 5a shows one example of an optical waveguide formed on the surface of a dielectric substrate in the first step of the method in FIG. 4.

According to one example illustrated in FIG. 5a, the optical waveguide formed on the surface of the dielectric substrate 10 is a planar optical waveguide 20. The planar optical waveguide 20 is formed down to a certain depth over the whole surface of the dielectric substrate 10. As illustrated in FIG. 5a, the width $w_p$ of the planar optical waveguide 20 is equal to the width $w_s$ of the dielectric substrate 10 and thus the electromagnetic wave is confined vertically over the whole width of the dielectric substrate 10. The planar optical waveguide 20 may be formed on the surface of the dielectric substrate 10 according to different techniques (for example deposition of titanium followed by a titanium diffusion, photon exchange followed by an annealing process, ion implantation, ion exchange, etc.) which are well known to those skilled in the art. One example of these techniques is given in the publication: S. Fouchet, A. Carenco, C. Daguet, R. Guglielmi, L. Riviere, "Wavelength dispersion of Ti induced refractive index change in $LiNbO_3$ as a function of diffusion parameters", Journal of Lightwave Technology, Volume: 5, Issue: 5, pp. 700-708, May 1987. Specifically, in this publication, it is described how a titanium-diffused planar waveguide can be obtained from a deposition of titanium followed by a diffusion at a temperature of around 1030° C. in a wet atmosphere.

Figure 5B:
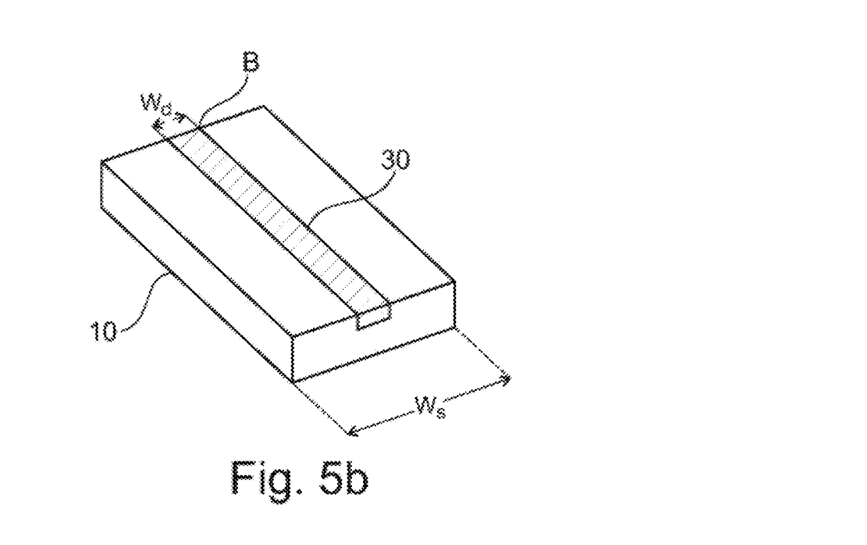
FIG. 5b shows another example of an optical waveguide formed on the surface of a dielectric substrate in the first step of the method in FIG. 4.

According to another example illustrated in FIG. 5b, the optical waveguide formed on the surface of the dielectric substrate 10 is a microstrip optical waveguide 30. The microstrip optical waveguide 30 comprises a strip which is formed down to a certain depth of the surface of the dielectric substrate 10 and which has a certain width $w_d$. As illustrated in FIG. 5b, the width $w_d$ of the microstrip optical waveguide 30 is smaller than the width $w_s$ of the dielectric substrate 10. In the case of the microstrip optical waveguide 30, the electromagnetic wave is vertically confined only in the region of the strip of width $w_d$ and it is guided only through this region of the strip. 'Region of the strip' defines a region comprising the strip, together with a section around the strip within which the guided electromagnetic energy is greater than or equal to 10% of the maximum electromagnetic energy of the optical mode. The microstrip optical waveguide 30 may be formed on the surface of the dielectric substrate 10 according to different techniques which are well known to those skilled in the art. One example of these techniques is given in the publication: Armenise, M. N., "Fabrication techniques of lithium niobate waveguides," *Optoelectronics, IEE Proceedings J,* Vol. 135, No. 2, pp. 85-91, April 1988". Specifically, in this publication, it is notably described how a titanium-diffused microstrip optical waveguide may be formed based on the deposition of a strip of titanium previously defined by a lithography step, and then diffused at a temperature of around 1030° C. It should be noted that the microstrip optical waveguide is also known as "straight optical waveguide" or "channel optical waveguide".

It should be noted that the step 100 for formation of an optical waveguide (planar or microstrip) on the surface of the dielectric substrate 10 in order to provide the vertical confinement of the electromagnetic wave corresponds to the preliminary step in the formation of an optical waveguide (planar or microstrip) on the surface of a dielectric substrate of the prior art. Furthermore, it should be noted that it is known to those skilled in the art that the fact that the optical waveguide (planar or microstrip) is formed on the surface of a dielectric substrate means that the optical waveguide is defined by a region having a refracting index higher than the refracting index of the dielectric substrate, which region guides the electromagnetic wave.

In a step 200 of the method in FIG. 4, the dicing of two parallel recesses R1, R2 separated by a distance $w_r$ is carried out on the surface of the dielectric substrate 10, in order to form a ridge optical waveguide 40 with a width $w_r$ raised up between the two recesses R1, R2. As illustrated in the two examples of ridge optical waveguides in FIGS. 6a and 6b, this dicing of two recesses R1, R2 on the surface of the dielectric substrate 10 is such that the depth of the first recess R1 and of the second recess R2 varies continuously and progressively between a depth of zero at the location of the first end of the optical waveguide designed to receive an optical fiber 5, and a maximum depth $H_m$ at a predetermined distance $I_p$ from the first end of the optical waveguide. The depth variation of each recess R1 and R2 forms a vertical optical mode transition region 50 between the ridge optical waveguide 40 and the optical fiber 5 which is coupled with the ridge optical waveguide 40. This vertical transition region 50 has a length equal to the predetermined distance $I_p$ from the first end of the optical waveguide and has a rounded profile. Furthermore, as illustrated in the two examples of the ridge optical waveguides in FIGS. 6a and 6b, the optical fiber 5 coupled with these ridge optical waveguides comprises a core 8' which transmits the electromagnetic energy along the optical fiber 5 and which is surrounded by a sheath 9'.

Figure 6A:
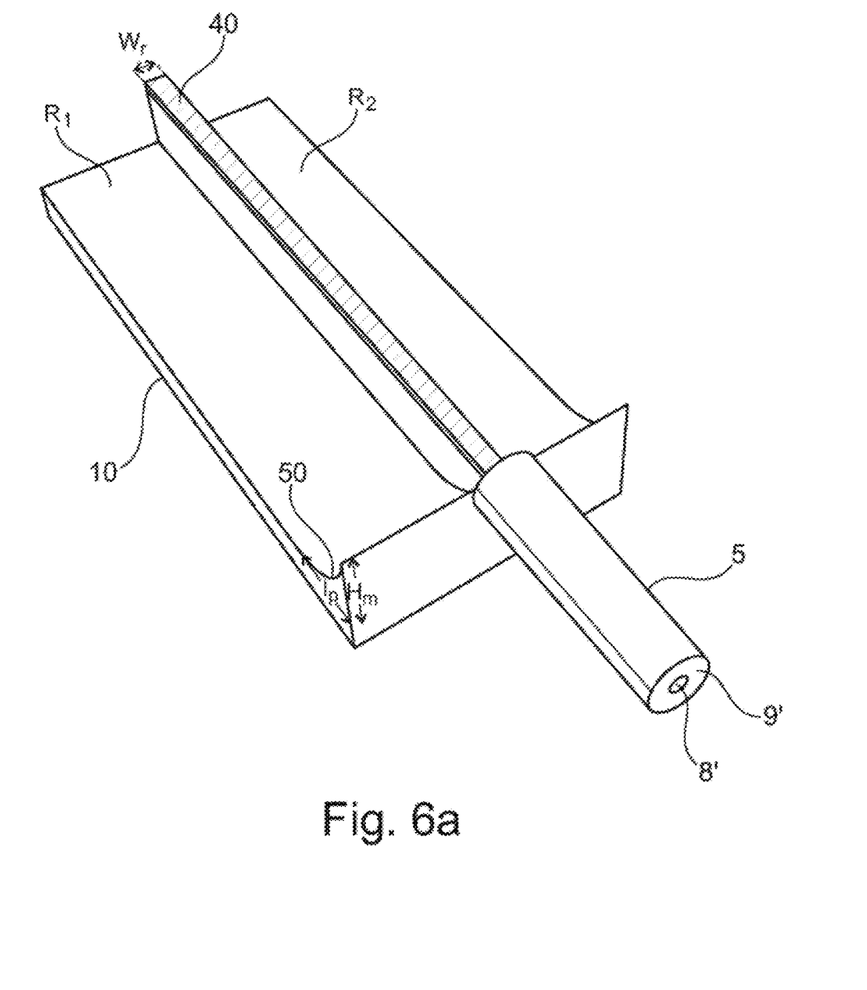
FIG. 6a shows one example of a ridge optical waveguide formed in the second step of the method in FIG. 4.
Figure 6B:
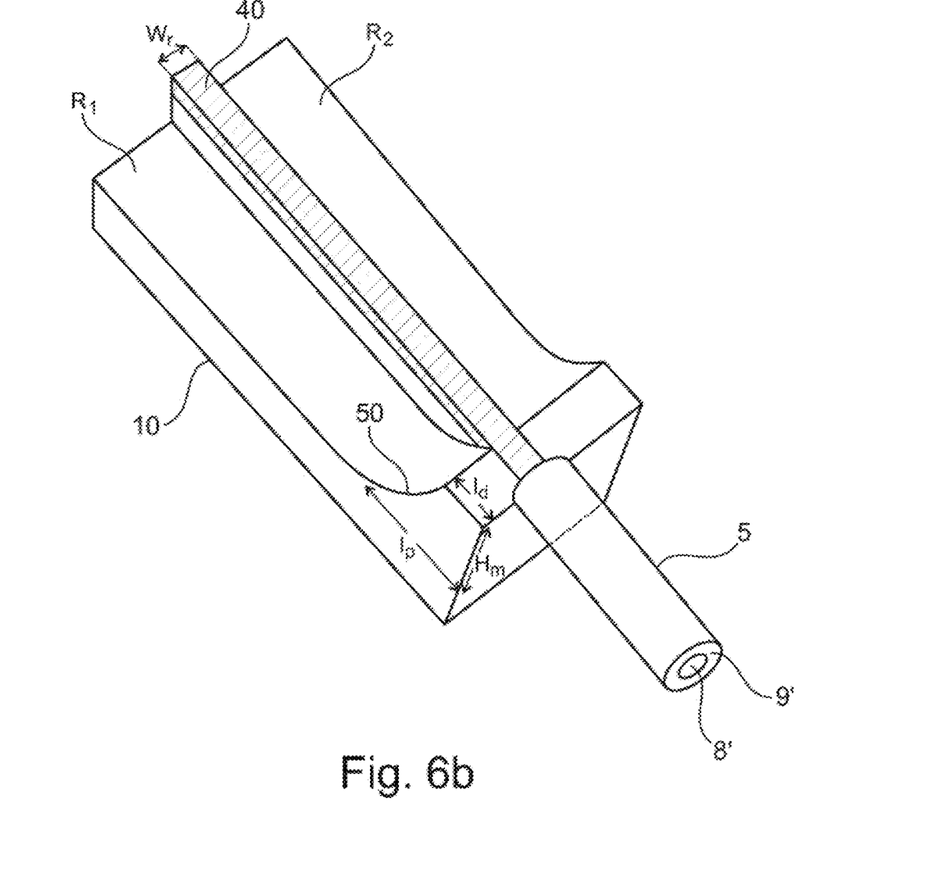
FIG. 6b shows another example of a ridge optical waveguide formed in the second step of the method in FIG. 4.

However, it should be noted that, in the example in FIG. 6a, the reduction in the depth of the two recesses R1, R2 during the dicing of the surface of the dielectric substrate 10 is carried out starting from the first end of the planar optical waveguide 20 in FIG. 5a, whereas in the example in FIG. 6b, the depth reduction of the two recesses R1, R2 is carried out starting from a predetermined distance $I_d$ from the first end of the microstrip optical waveguide 30 in FIG. 5b. Thus, in the example of the ridge optical waveguide 40 in FIG. 6a, the vertical optical mode transition region 50 between the ridge optical waveguide 40 and the optical fiber 5 starts from the first end of the planar optical waveguide 20, whereas in the example of the ridge optical waveguide 40 in FIG. 6b, this vertical transition region 50 starts from a predetermined distance $I_d$ from the first end of the microstrip optical waveguide 30.

It should be noted that, in the example of the ridge optical waveguide 40 in FIG. 6b, the dicing of the dielectric substrate 10 is carried out on the two sides of the microstrip optical waveguide 30 in such a manner that the width $w_r$ of the ridge optical waveguide 40 formed after this dicing has the same width, or potentially a larger width, than the width $w_d$ of the microstrip optical waveguide 30 in FIG. 5b.

Figure 7:
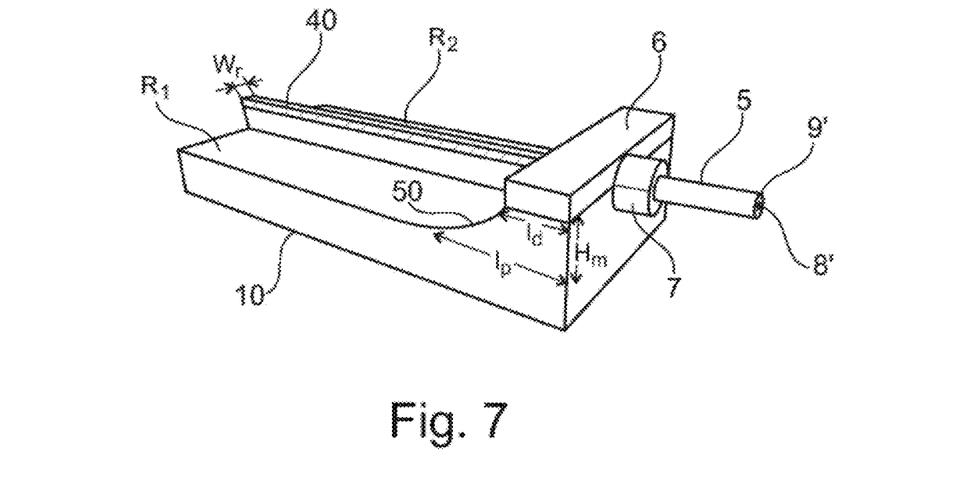
FIG. 7 shows the ridge optical waveguide in FIG. 6b with a shim piece and a collar.

Furthermore, it should be noted that the configuration of the ridge optical waveguide 40 in FIG. 6b, according to which the depth reduction of the two recesses R1, R2 during the dicing of the surface of the dielectric substrate 10 is carried out starting from a predetermined distance $I_d$ from the first end of the microstrip optical waveguide 30, offers the advantage of allowing a shim piece 6 to be bonded onto the part of the surface of the dielectric substrate 10 of length $I_d$ that is not diced (see FIG. 7). The shim piece 6 is used to improve the bonding between the ridge optical waveguide and the optical fiber since, as illustrated in FIG. 7, it allows a collar 7 positioned at the first end of the optical waveguide to be bonded in order to rigidly attach the optical fiber 5 at the coupling position with the ridge optical waveguide 40. It should be noted that the shim piece 6 and the collar 7 are elements already used in the field of optical waveguides and they are well known to those skilled in the art. It should be noted that FIG. 7 illustrates a ridge optical waveguide having the same configuration as the ridge optical waveguide in FIG. 6b but additionally comprising the shim piece 6 and the collar 7.

Figure 8:
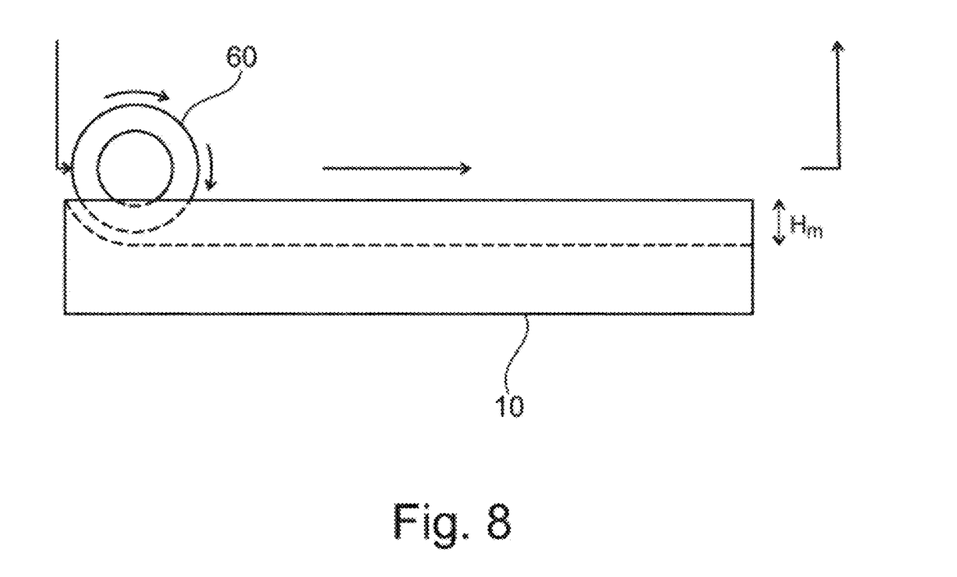

By way of example, the dicing of the surface of the dielectric substrate 10 for the formation of the ridge optical waveguide 40 in FIGS. 6a and 6b is a mechanical operation. The mechanical dicing may be carried out by means of a precision circular saw well known to those skilled in the art (see for example the publication "High aspect ratio lithium niobate ridge waveguides fabricated by optical grade dicing, J. Phys. D: Appl. Phys, 44 305101, (2011)"). As is the case in the aforementioned publication, the blade of the circular saw is programmed in such a manner that a polishing of the dielectric substrate 10 is carried out at the same time as the dicing of the dielectric substrate 10. The important criteria for obtaining a polishing of high quality at the same time as the dicing are the type and the speed (speed of rotation and speed of translation) of the blade of the circular saw. Those skilled in the art will know how to choose the type and the speed of the blade of the circular saw with regard to the dielectric substrate used. In one particular example, the blade of the circular saw is progressively lowered at the location of the predetermined distance $I_p$ from the first end of the optical waveguide, in such a manner that the depth varies as a circular arc of radius equal to the radius of the blade of the circular saw. Specifically, as illustrated in FIG. 8, once the blade 60 has reached a desired depth $H_m$ of the dielectric substrate 10 for the dicing of the recesses R1 and R2, it executes a translational movement parallel to the surface of the dielectric substrate 10. The path followed by the circular saw 60, in order to carry out the dicing-polishing of the dielectric substrate 10, is represented by the arrows in FIG. 8.

FIG. 8 illustrates one example of dicing of the surface of the dielectric substrate 10 carried out for fabricating a ridge optical waveguide having the configuration of the ridge optical waveguide of the example in FIG. 6a. According to the configuration of the ridge optical waveguide in FIG. 6a, the depth reduction of the two recesses R1, R2 during the dicing of the surface of the dielectric substrate 10 by the blade 60 is carried out starting from the first end of the planar optical waveguide 20 in FIG. 5a. However, it should be noted that the dicing by the blade 60 may also be such that the depth reduction of the two recesses R1, R2 is carried out starting from a predetermined distance $I_d$ from the first end of the microstrip optical waveguide 30 in FIG. 5b, thus resulting in the configuration of the ridge optical waveguide 40 in FIG. 6b. In that case, the blade 60 is programmed so as to cut away the dielectric substrate 10 on the two sides of the microstrip optical waveguide 30 in such a manner that the width $w_r$ of the ridge optical waveguide 40 formed after this dicing has the same width, or potentially a larger width, than the width $w_d$ of the microstrip optical waveguide 30.

In another example, the mechanical dicing is carried out by means of two circular saws with the same axis and set apart from one another by the width $w_r$ of the ridge optical waveguide.

In another example, the dicing of the surface of the dielectric substrate 10 for the formation of the ridge optical waveguide 40 in FIGS. 6a and 6b is carried out by laser etching instead of mechanical dicing. According to one example, a femtosecond laser is used, instead of a circular saw, to perform the dicing of the surface of the dielectric substrate 10 in order to form the ridge optical waveguides of the examples in FIG. 6a and FIG. 6b, which comprise a vertical optical mode transition region 50 between the ridge optical waveguide and the optical fiber. Specifically, the dicing of a dielectric substrate composed of lithium niobate (LiNbO$_3$) or of glass requires a femtosecond laser with a minimum fluence of 1 J/cm$^2$. However, it should be noted that, owing to the chemical and structural alterations generated by the laser spot, the dicing of the dielectric substrate by means of the light beam from a femtosecond laser forms ridge optical waveguides having a higher roughness than the roughness of the ridge optical waveguides formed by dicing the dielectric substrate by means of the blade of a circular saw.

Furthermore, in another example illustrated in FIG. 9, the dicing of the dielectric substrate 10 is such that, outside of the formation of a vertical optical mode transition region 50 between the ridge optical waveguide 40 and the optical fiber 5 described hereinabove, the formation of a second optical mode transition region 50' is carried out between the ridge optical waveguide 40 and an optical fiber 5' coupled with the ridge optical waveguide 40 on the second end of the optical waveguide. Specifically, in this example, the depth of each recess (R1, R2) varies continuously and progressively between a depth of zero at the location of the second end of the optical waveguide designed to receive the optical fiber 5' and a maximum depth at a predetermined distance ($I_p$) from the second end of the optical waveguide. The depth variation of each recess (R1, R2) forms a vertical optical mode transition region 50' of length $I_p$ between the ridge optical waveguide and the optical fiber 5' coupled with the ridge optical waveguide 40. This vertical optical mode transition region 50' between the ridge optical waveguide 40 and the optical fiber 5' has a length equal to the predetermined distance ($I_p$) from the second end of the optical waveguide and has a rounded profile, as is the case of the vertical optical mode transition region 50 between the ridge optical waveguide 40 and the optical fiber 5.

Figure 9:
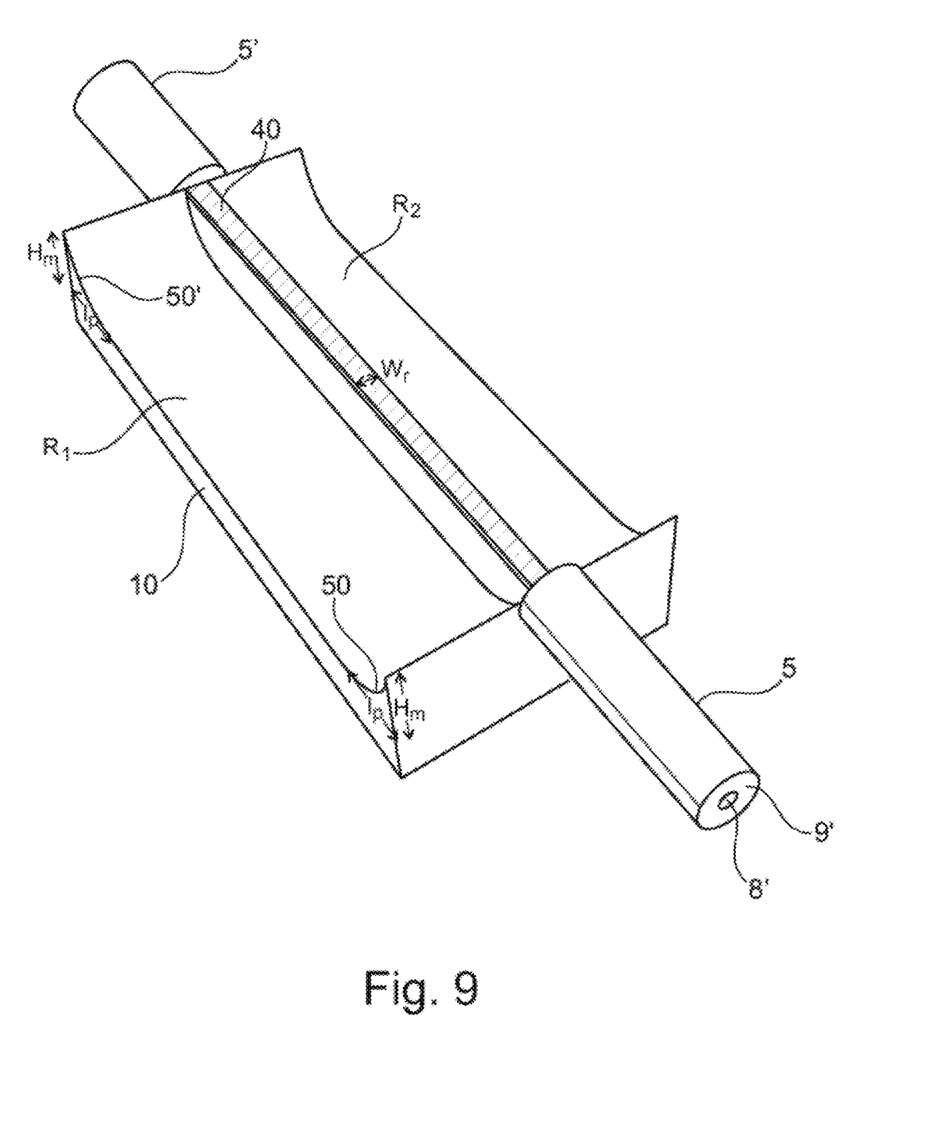
FIG. 9 shows a ridge optical waveguide comprising two vertical optical mode transition regions between the ridge optical waveguide and an optical fiber.

The dicing of the dielectric substrate 10 in the example of FIG. 9 may be carried out by means of a circular saw or by means of a femtosecond laser. According to one particular example (not shown in the figures), where this dicing is carried out by means of a blade of the circular saw, this blade is progressively lowered at the location of the predetermined distance ($I_p$) from the first end of the optical waveguide designed to receive the optical fiber 5, in such a manner that the depth varies as a circular arc of radius equal to the radius of the blade of the circular saw. Once the blade has reached a desired depth of the dielectric substrate 10 for the dicing of the recesses R1 and R2, it executes a translational movement parallel to the surface of the dielectric substrate 10. Then, once the blade has reached a predetermined distance ($I_p$) from the second end of the optical waveguide, it is continuously and progressively raised in such a manner that the depth varies as a circular arc of radius equal to the radius of the blade of the circular saw, until a depth of zero is reached at the location of the second end of the optical waveguide designed to receive the optical fiber 5'.

It should be noted that in the example in FIG. 9, the depth reduction of the two recesses R1, R2 during the dicing of the surface of the dielectric substrate 10 is carried out starting from the first end and from the second end of the planar optical waveguide 20 in FIG. 5a. However, according to another example, the depth reduction of the two recesses R1, R2 is carried out starting from a predetermined distance $I_d$ from the first end and from the second end of the microstrip optical waveguide 30 in FIG. 5b.

It should be noted that, after experiments, it has been observed that the vertical optical mode transition region 50 between the ridge optical waveguides and an optical fiber allows the coupling losses between the optical mode of the ridge optical waveguide and the optical mode of the optical fiber to be significantly reduced. In one experiment, the coupling losses between the ridge optical waveguide and a conventional optical fiber SMF28 have been measured for a ridge optical waveguide without such a vertical transition region 50 (see the ridge optical waveguide in FIG. 1) and a ridge optical waveguide with such a vertical transition region 50. As far as the ridge optical waveguide in FIG. 1 is concerned, the coupling losses for the TE (Transverse Electric) polarizations and for the TM (Transverse Magnetic) polarizations of the electromagnetic wave are approximately 2.8 dB. In contrast, as far as the ridge optical waveguide with a vertical transition region 50 is concerned, the coupling losses for the TE (Transverse Electric) polarizations and for the TM (Transverse Magnetic) polarizations of the electromagnetic wave are approximately 0.8 dB. It should be noted that the two ridge optical waveguides compared (without and with the vertical transition region 50) have been fabricated under the same conditions, with the same dimensions, in other words with a width of 6 μm and a depth of 30 μm.

Figure 10A:
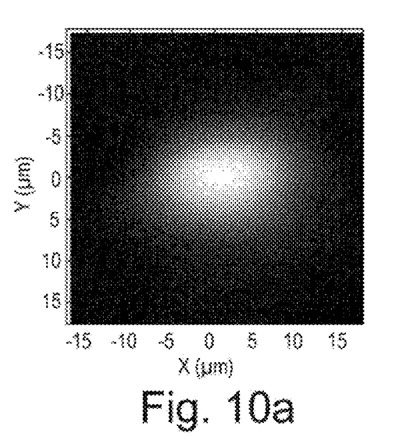
FIGS. 10a-10b show images of the optical modes obtained at the exit of a ridge optical waveguide for the TE (Transverse Electric) and TM (Transverse Magnetic) polarizations, respectively, with a vertical optical mode transition region between the ridge optical waveguide and an optical fiber.
Figure 10B:
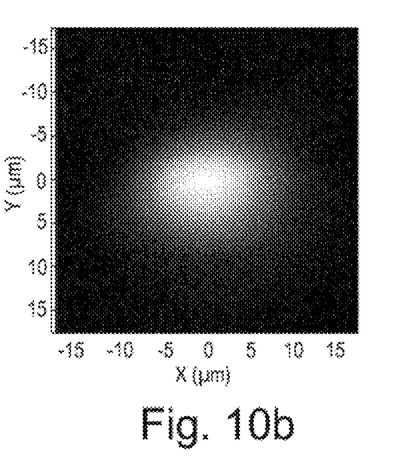
Figure 11A:
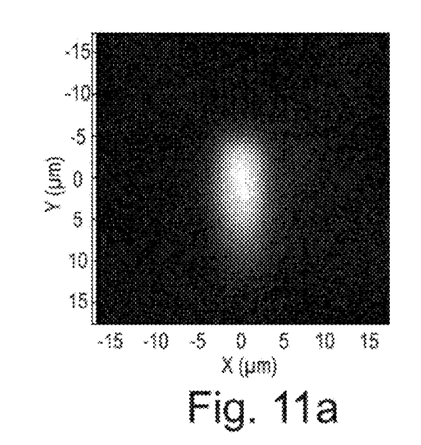
FIGS. 11a-11b show images of the optical modes obtained at the exit of a ridge optical waveguide for the TE (Transverse Electric) and TM (Transverse Magnetic) polarizations, respectively, without a vertical optical mode transition region between the ridge optical waveguide and an optical fiber.
Figure 11B:
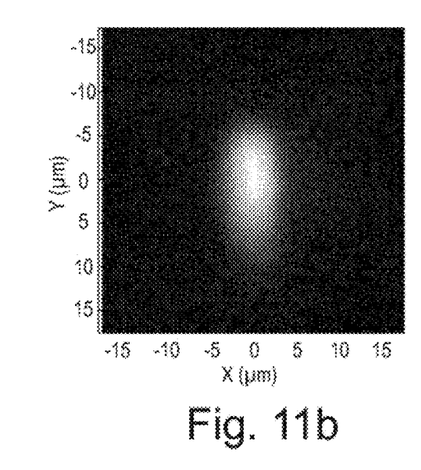

Specifically, it has been observed that this vertical transition region 50 serves to convert the optical mode of the ridge optical waveguide into a less confined optical mode which is matched to the optical mode of the optical fiber. Specifically, FIGS. 10a-10b show images of the optical modes obtained at the exit of a ridge optical waveguide with a vertical transition region 50, for the TE (Transverse Electric) and TM (Transverse Magnetic) polarizations, respectively, whereas FIGS. 11a-11b show images of the optical modes obtained at the exit of a ridge optical waveguide without a vertical transition region 50 for the TE (Transverse Electric) and TM (Transverse Magnetic) polarizations, respectively. It should be noted that the optical modes obtained at the exit of the ridge optical waveguides in FIGS. 10a-10b and FIGS. 11a-11b show the distribution of the electromagnetic energy at the exit of these ridge optical waveguides obtained by injecting into these ridge optical waveguides an electromagnetic wave coming from a laser having a wavelength of 1550 nm and an optical power of 0.2 mW. The ridge optical waveguides in FIGS. 10a-10b and 11a-11b are fabricated under the same conditions and have the same dimensions, in other words a width of 6 μm and a depth of 30 μm.

Comparing FIGS. 10a and 11a together with FIGS. 10b and 11b, it is clear that the optical modes obtained at the exit of a ridge optical waveguide with a vertical transition region 50 are less confined than the optical modes obtained at the exit of a ridge optical waveguide without a vertical transition region 50. Thus, the confinement of the optical modes obtained at the exit of a ridge optical waveguide with a vertical transition region 50 is better matched to the optical modes of a conventional optical fiber which are weakly confined. Furthermore, the coupling losses between the optical modes of the ridge optical waveguides in FIGS. 10a-10b and 11a-11b and the optical mode of a conventional optical fiber may be evaluated by means of the integral overlap n (see equation 1) between the optical mode of these ridge optical waveguides and the optical mode of the conventional optical fiber. Specifically, it has been observed that the integral overlap n is only 52% when the optical fiber is connected to the ridge optical waveguide in FIGS. 11a-11b without a vertical transition region 50, whereas it is 80% when the optical fiber is connected to the ridge optical waveguide in FIGS. 10a-10b with a vertical transition region 50.

It should be noted that the ridge optical waveguides fabricated by the method in FIG. 4 may be used in numerous fields such as for example the field of aerospace, the field of optical telecommunications and the field of lasers.

Furthermore, it should be noted that the method in FIG. 4 is particularly suited to ridge optical waveguides with graded refracting index on the surface of the dielectric substrate, for which the electromagnetic wave is guided by virtue of a continuous vertical variation of the refracting index on the surface of the dielectric substrate, or to ridge optical waveguides with discontinuous refracting index on the surface of the dielectric substrate, for which the electromagnetic wave is guided by virtue of a local variation of the refracting index on the surface of the dielectric substrate.

It should be noted that, in both cases (optical waveguides with graded refracting index or discontinuous refracting index), the electromagnetic wave is guided in the optical waveguide by virtue of a refracting index higher than the refracting index of the dielectric substrate. This region of higher refracting index defines the optical waveguide formed by the step 100 in FIG. 4 which may be either a planar waveguide or a microstrip waveguide. Furthermore, it should be noted that this region of refracting index higher than the refracting index of the dielectric substrate results from the various techniques for the formation of a planar waveguide or of a microstrip waveguide described hereinabove (see the aforementioned publications by S. Fouchet et al. and by M. N Armenise).

The fact that the electromagnetic wave is guided in the optical waveguide by virtue of a region of refracting index higher than the refracting index of the dielectric substrate allows lower coupling losses between the ridge optical waveguide and the optical fiber using dielectric substrates having thicknesses between 200 nm and several mm. In particular, it has been observed that the coupling losses between the ridge optical waveguide and the optical fiber are significantly reduced for thicknesses of the dielectric substrate greater than 10 μm. It should be noted that, if the electromagnetic wave has been guided within the dielectric substrate and not via a region with a refracting index higher than the refracting index of the dielectric substrate as described hereinabove, it would not be possible to obtain low coupling losses by using thicknesses of the dielectric substrate greater than 10 μm since the greater the thickness of the dielectric substrate beyond 10 μm, the smaller is the overlap of the optical mode of the ridge optical waveguide with the optical mode of a conventional optical fiber which has a lateral and vertical width at half-height of the optical mode typically of around 5 μm.

Furthermore, it has been observed that the optical losses in the vertical transition regions 50 and 50' in FIGS. 6a, 6b, 7 and 9 are low, and specifically they are less than 0.1 dB, when the radius of curvature of the vertical transition regions 50 and 50' is greater than 20 mm. In that case, there is no need for further processing (by laser or focused ion beam) of the ridge optical waveguide in order to improve the optical losses. As is known to those skilled in the art, the optical losses in the vertical transition region correspond to the ratio between the optical power at the exit of the vertical transition region and the optical power at the entry of the vertical transition region.

It has also been observed that the lateral confinement of the optical mode of the ridge optical waveguide is improved if the depth of the recesses is greater than 10 μm.

The invention claimed is:

1. A method for producing a ridge optical waveguide having low coupling losses between the ridge optical waveguide and an optical fiber, the method comprising:
   forming an optical waveguide on a surface of a dielectric substrate, the optical waveguide having a first end and a second end opposite to the first end;
   dicing, with a blade of a circular saw, two parallel recesses separated by a distance ($w_r$) on the surface of the dielectric substrate to form a ridge optical waveguide with a width (wr) raised up between the two recesses, wherein the depth of each recess varies continuously and progressively between a depth of zero at the first end of the optical waveguide designed to receive the optical fiber, and a maximum depth ($H_m$) at a predetermined distance ($l_p$) from the first end of the optical waveguide, the depth variation of each recess forming a vertical optical mode transition region of a length ($l_p$) between the ridge optical waveguide and the optical fiber,
   wherein the blade is progressively lowered at the location of the predetermined distance $l_p$ from the first end of the optical waveguide in a manner that the depth varies as a circular arc of radius equal to a radius of the blade of the circular saw.

2. The method according to claim 1, in which the optical waveguide is a planar waveguide.

3. The method according to claim 2, in which a depth reduction of each recess is carried out starting from the first end of the optical waveguide.

4. The method according to claim 1, in which the optical waveguide is a microstrip waveguide.

5. The method according to claim 4, in which a depth reduction of each recess is carried out starting from a predetermined distance from the first end of the optical waveguide.

6. The method according to claim 1 wherein, once the blade reaches a desired depth of the recesses, the blade executes a translational movement parallel to the surface of the dielectric substrate.

7. The method according to claim 1 wherein, the dicing is such that the depth of each recess varies continuously and progressively between a depth of zero at the second end of the optical waveguide and a maximum depth at a predetermined distance ($I_d$) from the second end of the optical waveguide, the depth variation of each recess forming a vertical optical mode transition region of length ($I_d$) between the ridge optical waveguide and an optical fiber.

8. A ridge optical waveguide having low coupling losses between the ridge optical waveguide and an optical fiber, wherein the waveguide is fabricated by the method according to claim 1.

9. A method for producing a ridge optical waveguide having low coupling losses between the ridge optical waveguide and an optical fiber, the method comprising:
forming an optical waveguide on a surface of a dielectric substrate, the optical waveguide having a first end and a second end opposite to the first end;
dicing two parallel recesses separated by a distance $w_r$ on the surface of the dielectric substrate to form a ridge optical waveguide with a width ($w_r$) raised up between the two recesses,
wherein a depth of each recess varies continuously and progressively between a depth of zero at the first end of the optical waveguide designed to receive the optical fiber, and a maximum depth ($H_m$) at a predetermined distance ($I_p$) from the first end of the optical waveguide, the depth variation of each recess forming a vertical optical mode transition region of a length ($I_p$) between the ridge optical waveguide and the optical fiber,
wherein the dicing is by a circular saw comprising at least one blade, and wherein once the blade reaches a desired depth of the recesses, the blade executes a translational movement parallel to the surface of the dielectric substrate.

10. A method for producing a ridge optical waveguide having low coupling losses between the ridge optical waveguide and an optical fiber, the method comprising:
forming an optical waveguide on a surface of a dielectric substrate, the optical waveguide having a first end and a second end opposite to the first end;
dicing two parallel recesses separated by a distance $w_r$ on the surface of the dielectric substrate to form a ridge optical waveguide with a width ($w_r$) raised up between the two recesses,
wherein a depth of each recess varies continuously and progressively between a depth of zero at the first end of the optical waveguide designed to receive the optical fiber, and a maximum depth ($H_m$) at a predetermined distance ($I_p$) from the first end of the optical waveguide, the depth variation of each recess forming a vertical optical mode transition region of a length ($I_p$) between the ridge optical waveguide and the optical fiber,
wherein the dicing is by a circular saw having two blades with the same axis and set apart from one another by the width ($w_r$) of the ridge optical waveguide, and
wherein the blades are progressively lowered at the location of the predetermined distance $I_p$ from the first end of the optical waveguide, in such a manner that the depth varies as a circular arc of radius equal to a radius of the blades of the circular saw.

11. A method for producing a ridge optical waveguide having low coupling losses between the ridge optical waveguide and an optical fiber, the method comprising:
forming an optical waveguide on a surface of a dielectric substrate, the optical waveguide having a first end and a second end opposite to the first end;
dicing, by laser etching, two parallel recesses separated by a distance $w_r$ on the surface of the dielectric substrate to form a ridge optical waveguide with a width ($w_r$) raised up between the two recesses,
wherein a depth of each recess varies continuously and progressively between a depth of zero at the first end of the optical waveguide designed to receive the optical fiber, and a maximum depth ($H_m$) at a predetermined distance ($I_p$) from the first end of the optical waveguide, the depth variation of each recess forming a vertical optical mode transition region of a length ($I_p$) between the ridge optical waveguide and the optical fiber,
wherein the laser etching is progressively made at the location of the predetermined distance $I_p$ from the first end of the optical waveguide, in such a manner that the depth varies as a circular arc of radius.

12. The method according to claim 11, wherein the optical waveguide is a planar waveguide.

13. The method according to claim 12, wherein the depth reduction of each recess is carried out starting from the first end of the optical waveguide.

14. The method according to claim 11, wherein the optical waveguide is a microstrip waveguide.

15. The method according to claim 14, wherein the depth reduction of each recess is carried out starting from a predetermined distance from the first end of the optical waveguide.

16. The method according to claim 11 wherein, once the laser etching reaches a desired depth of the recesses, the laser etching executes a translational movement parallel to the surface of the dielectric substrate.

17. The method according to claim 11 wherein, the dicing is such that the depth of each recess varies continuously and progressively between a depth of zero at the location of the second end of the optical waveguide and a maximum depth at a predetermined distance ($I_d$) from the second end of the optical waveguide designed to receive an optical fiber, the depth variation of each recess forming a vertical optical mode transition region of length ($I_d$) between the ridge optical waveguide and an optical fiber.

18. A ridge optical waveguide having low coupling losses between the ridge optical waveguide and an optical fiber, wherein the ridge optical waveguide is fabricated by the method according to claim 11.

19. A method for producing a ridge optical waveguide having low coupling losses between the ridge optical waveguide and an optical fiber, the method comprising:
forming an optical waveguide on a surface of a dielectric substrate, the optical waveguide having a first end and a second end opposite to the first end;
dicing two parallel recesses separated by a distance $w_r$ on the surface of the dielectric substrate to form a ridge optical waveguide with a width ($w_r$) raised up between the two recesses,
wherein a depth of each recess varies continuously and progressively between a depth of zero at the first end of the optical waveguide designed to receive the optical fiber, and a maximum depth ($H_m$) at a predetermined distance ($I_p$) from the first end of the optical waveguide, the depth variation of each recess forming a vertical optical mode transition region of a length ($l_p$) between the ridge optical waveguide and the optical fiber,
wherein the dicing is carried out by laser etching, and
wherein the etching is progressively done at the predetermined distance $l_p$ from the first end of the optical waveguide in such a manner that the depth varies as a circular arc of radius.

* * * * *